Feb. 11, 1958   N. N. RIPS ET AL   2,822,647
METHOD AND APPARATUS FOR FORMING BIFOCAL LENSES
Filed Dec. 16, 1955
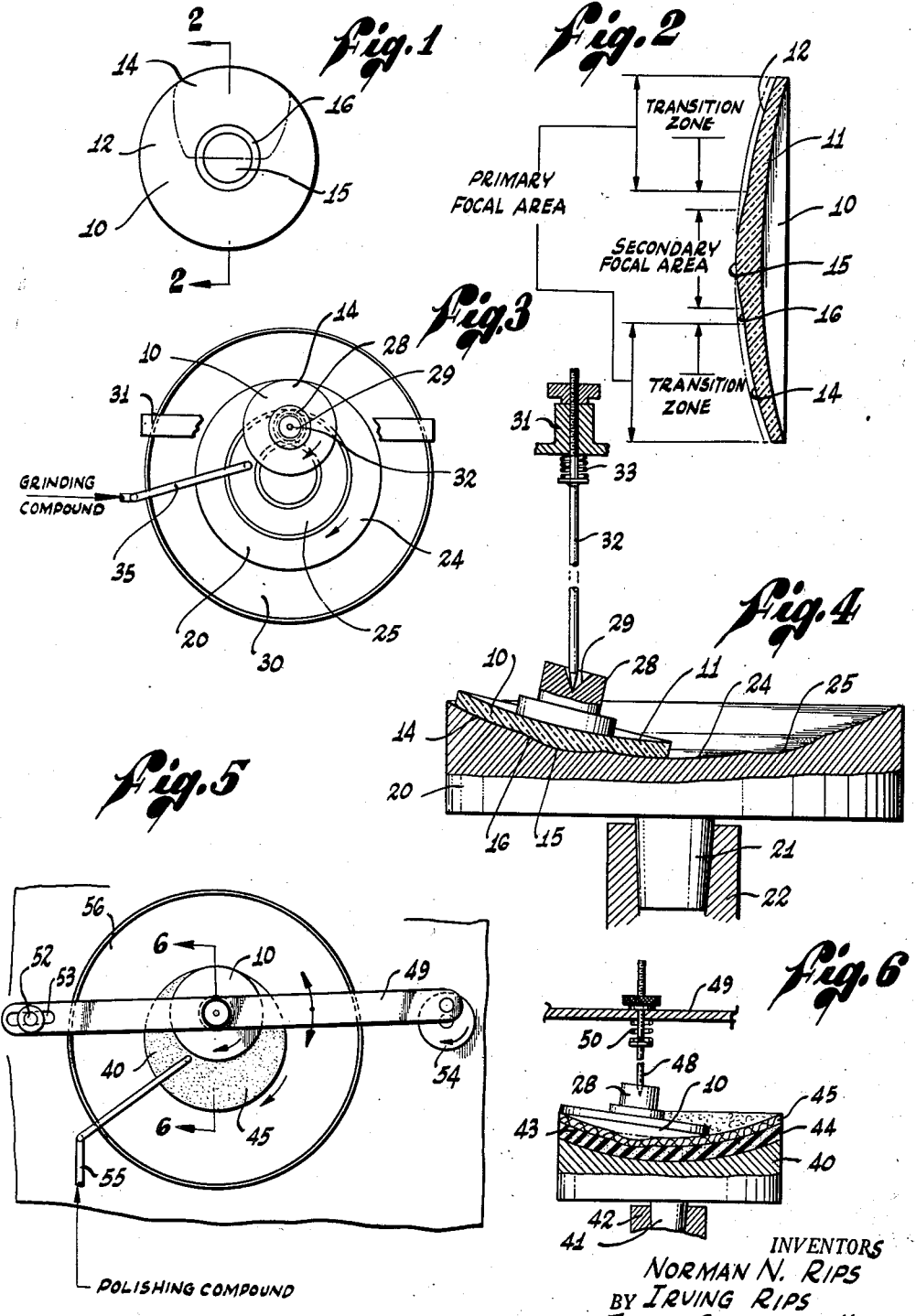
INVENTORS
NORMAN N. RIPS
BY IRVING RIPS
ATTORNEYS

United States Patent Office 2,822,647
Patented Feb. 11, 1958

2,822,647

METHOD AND APPARATUS FOR FORMING BIFOCAL LENSES

Norman N. Rips and Irving Rips, Los Angeles, Calif., assignors to Younger Manufacturing Company, Los Angeles, Calif., a corporation of California Application December 16, 1955, Serial No. 553,664

9 Claims. (Cl. 51—133)

This invention relates generally to eyeglasses or spectacles and more particularly to a method and apparatus for forming bifocal lenses for use therein.

The most common type of bifocal lenses include a primary or distance vision area of one power and a reading area of a greater power joined together along a visible boundary line on the surface of the glass. Bifocal lens may be made either by fusing together two pieces of glass having different indexes of refraction to provide the areas of different power, or by grinding upon the surface of a single piece of glass, areas having different curvature so as to provide the desired powers. In either case the visible line of joinder between the two areas is highly objectionable to the wearer of the glasses since it forms a line across which the focus of the eye must jump, causing an uncomfortable sensation and a momentary loss of vision which may be quite dangerous.

The foregoing problem is one of long standing and various proposals have been made to join the two areas in such a manner that the discomfort to the wearer of the glasses is reduced. The most satisfactory of these proposals involves the use of a transition zone upon a one-piece bifocal which lies between the reading and primary areas and has a curvature such as to merge smoothly with the normal spherical curvature of the two areas. Such a lens has been disclosed in several earlier patents.

While bifocal lenses having a proper transition zone have long been known, they have only been produced in small quantities because of the difficulty and expense of grinding the proper curvatures upon the face of the lens. The present invention provides a method and apparatus for grinding and polishing such lenses which is relatively simple, hence economical, and yet accurately forms the desired surfaces upon the faces of the lens.

The invention contemplates the formation of a conventional type of lens blank having a circular concave-convex shape provided on one face with a normal or plain spherical curvature and upon the other face with a primary outer area of one spherical curvature, a secondary concentric inner area of a different spherical curvature, and an annular zone between the two areas which has a transition curvature such as to merge the zone surface with the adjacent surfaces without any visible line of demarcation or joinder. The completed lens blank may then be finished with any special optical prescription of the wearer ground into the face having the plain spherical surface, in accordance with conventional practice, and the edges of the lens blank trimmed to any desired shape for fitting within the spectacle frames.

It is to be understood that the primary and secondary areas and intermediate transition zone may be formed upon either the outer or inner face of the lens blank with the opposite face finished spherically. While the embodiment of the apparatus described herein is adapted for use in forming the desired areas and transition zone upon the outer face of a lens blank, such is merely illustrative and is not intended as a limitation upon the scope of the invention.

As will be appreciated, it is necessary to optically grind and polish all of the portions of the lens to the desired curvature while maintaining the proper relationship between them for smooth transition. If the formation of the different portions is attempted by separate operations severe problems of alignment, angular relationships, and concentricity are encountered. On the other hand if all of the portions are ground and polished simultaneously it is difficult to provide a method and means whereby the grinding and polishing of each individual portion does not interfere with the operations on the other portions.

With the foregoing in mind it is a major object of this invention to provide a method of simultaneously grinding and polishing a bifocal lens of the character described wherein each portion is accurately finished in proper relationship to the other portions.

An equally important object of the invention is to provide apparatus for forming a bifocal lens of the type described wherein the surface shape and construction of the grinding and polishing tools is such as to simultaneously finish all portions of the lens.

A further object of the invention is to provide a method and apparatus for grinding a bifocal lens wherein the face of the lens is moved relative to a rotatable grinding surface in an orbital path about an operating axis so that there are no dead areas of non-grinding contact therebetween.

It is also an object of the invention to provide a method and apparatus for grinding a bifocal lens wherein the area of the lens where the most grinding is required has overall surface grinding contact.

Another object of the invention is to provide a grinding lap having a spherical surface formed with an annular zone thereon having a surface displaced from the spherical surface and shaped in radial cross section to form the transition zone and the secondary focal area of the lens.

Still another object of the invention is to provide grinding apparatus of a self-centering type wherein rigid and accurate centering means are not required.

It is a still further object of the invention to provide polishing apparatus including a polishing wheel having a polishing pad resiliently supported in such a manner that different curvature portions of a lens may be simultaneously polished.

These and other objects of the invention will become apparent from the following detailed description of a preferred method and apparatus and from an inspection of the accompanying drawings in which:

Figure 1 is a front elevation of a finished bifocal lens blank formed by the practice of the invention;

Figure 2 is a cross section taken along the line 2—2 of Figure 1;

Figure 3 is a diagrammatic view of the preferred grinding apparatus;

Figure 4 is a cross sectional detail of the grinding apparatus;

Figure 5 is a diagrammatic plan view of the preferred polishing apparatus; and

Figure 6 is a cross sectional detail of the polishing apparatus.

Referring now to the drawings and particularly to Figures 1 and 2 thereof, a lens blank 10 made by the practice of the invention is seen to be of circular shallow dished shape. Both the front and rear faces of the lens blank 10 are of generally spherical curvature, the rear face in this embodiment having a concave suface 11 which which is of a single radius of curvature while the outer face 12 is of convex curvature modified to provide the desired bifocal areas and transition zone. After the blank 10 is finished, the edges thereof are cut away as is indicated in phantom line in Figure 1 to form a spectacle lens which is of the proper shape for fitting within the spectacle frames. If desired, blank 10 may be made of such a size that a pair of spectacle lenses can be cut from a single blank, each lying within a semi-circular portion of the blank.

Considering the cross-sectional shape of blank 10 as seen in Figure 2 in more detail, it will be noted that the front face 12 comprises three portions, an edge or peripheral area 14 which forms the largest portion of the lens, a concentric central area 15, and an intermediate annular zone 16. The outer area 14 has the same spherical curvature as that of the rear face 12, extending parallel thereto, and forms the primary or distance vision portion of the lens. The central or secondary area 15 forms the reading portion of the lens and a shorter radius of curvature which provides this area with an increased power, and causes it to project or hump forwardly from the primary area. The annular transition zone 16 has a surface curvature which is selected to smoothly merge into the areas 14 and 15 without any visible line of demarcation. As can be understood, the shape of the curvature upon the surface of zone 16 will vary depending upon the powers of areas 14 and 15 and their relative proportions. In practice it is desirable to make the width of zone 16 as small as possible while achieving a smooth transition. It will be appreciated that the relative curvature of the different portions of the lens are exaggerated in Figure 2 for illustration. In the finished lens it is impossible to see the different areas except by the use of proper testing instruments.

In order to form the front face of lens blank 10 a somewhat thicker blank is supplied. This blank is of simple convex spherical curvature on the front face and is ground and polished to remove the areas indicated in phantom line in Figure 2. As will be noted, considerably more glass is removed from the outer area 14 than from the central area 15, the latter being ground only sufficiently to remove any surface imperfection therefrom. The rear face 11 of blank 10 is likewise ground and polished, but since this operation is entirely conventional it need not be described herein.

To grind the front face of lens 10 a grinding lap 20 as is seen in Figures 3 and 4 is provided. Lap 20 is of circular shape and has a tapered lower hub 21 which is adapted to fit within a drive arbor 22 for rotation about the axis of the lap, which may be termed the operating axis of the grinding apparatus. The upper face of lap 20 has a concave spherical shape providing a main surface 24 which conforms to the curvature upon the primary area 14 of lens blank 10. The size of lap 20 is considerably greater than that of lens blank 10 and the front face of the lens may therefore be placed in surface contact with only a portion of the lap surface 24. However, since lap surface 24 has a uniform spherical curvature it can be understood that a change in the position of blank 10 relative to the lap surface does not affect the shape of the surface ground on the blank.

Formed on the lap surface 24 is an annular zone groove 25 which is recessed downwardly and is of a radial width equal to the outside diametral width of the transition zone 15 desired upon the finished blank 10. In radial cross section zone 25 has a curvature to conform to that of both zone 16 and secondary area 15 on the finished lens blank. In other words, the center of zone 25 has a curvature corresponding to that of the secondary area 15 while the outer annular edges of the zone which are adjacent surface 24 have a curvature corresponding to that of transition zone 16. Again in Figure 4, the actual curvatures have been exaggerated for illustration and it will be understood that zone 25 merges smoothly with surface 24 so that there are no visible lines of demarcation.

Lens blank 10 is prepared for grinding by cementing to the rear face 11 thereof a block 28 having typically a conical center socket 29 aligned with the axis of the lens blank. It is desirable that grinding lap 20 be mounted in an encircling bowl 30 which forms a stationary housing and lower drive arbor 22 extends downwardly through the bowl and is connected to suitable driving means (not shown) for rotating the arbor and the grinding lap at a relatively high rate of speed.

Extended across the top of bowl 30 and held rigidly in position is a support bar 31 which is offset from the center of lap 20. Bar 31 holds a centering spindle 32 vertically and the latter has a pointed tip adapted to fit within socket 29. A spring 33 may be mounted on spindle 32 to resiliently urge it downwardly against block 28 for proper grinding pressure of lens blank 10 against lap 20. Lens blank 10 is freely rotatable relative to spindle 32 and is also free for limited rocking motion so that it may adjust itself to seat tightly against the lap surface 24.

The position of spindle 32 relative to lap 20 is such that the center and axis of lens blank 10 is offset from the central operating axis of the lap with the axis of the lens blank extending approximately normal to lap surface 24 and passing through the median circle of lap zone 25. That is, blank 10 may be said to be centered upon zone 25 in the relationship as can be clearly seen in Figures 3 and 4.

To grind the front face of blank 10, lap 20 is rotated about its own operating axis with blank 10 held against lap surface 24 and zone 25 in the manner just described. Initially, the spherical surface of blank 10 lies only against lap surface 24 and the blank being held for rotation about its own center, is caused to rotate in accordance with the direction of rotation indicated by the directional arrows in Figure 3. The outer peripheral surface of blank 10 is ground down by contact with lap surface 24 to form the primary lens area 14. Grinding compound may be supplied to the grinding lap 20 through a tube 34 for providing the desired abrasive action.

As material is removed from the primary area 14 the central portion of blank 10 drops within lap zone 25 and grinding contact therebetween is created. The edge surfaces of lap zone 25 commence grinding the transition zone 16, and gradually as more material is removed, the secondary area 15 is ground to the desired curvature. Once the entire central portion of lens blank 10 is in contact across the entire bottom surface of zone 25 further grinding only reduces the thickness of the lens blank without changing its curvature, and need only be done to the extent necessary to remove imperfections and blemishes.

Several important features of the method of grinding lens blank 10 should be noted. First, it will be seen that the blank 10 has a relative orbital movement with lap 20, rotating about its own center and moving along the annular zone 25. There are therefore no dead areas of non-grinding contact as would occur if the lens blank were to be held concentrically with the operating axis of the lap about a non-moving center. Secondly, the orbital path of movement of the lens blank 10 on the lap 20 prevents the formation of any ridges or grooves on the surface of the blank as might be otherwise caused by the relatively rotatable engagement. Thirdly, it can be seen that in the outer area 14 of the lens blank where the most material must be removed by the grinding operation there is full surface contact between the blank and lap surface 24.

It might also be pointed out that the grinding operation is self-centering in that once the formation of secondary area 15 and zone 16 has started, the central portion of the lens blank seeks to remain within the zone 25 and need not be held rigidly therein by the spindle 32. This latter feature is important in permitting the apparatus to have a relatively lightweight and economical construction without danger of introducing eccentricity in the lens blank.

After the lens blank 10 has the front face completely ground it is necessary to polish the surfaces thereof to optical smoothness. The apparatus for accomplishing this is illustrated in Figures 5 and 6. It will be appreciated that in polishing the areas of the lens, it is not desired to change the relative curvatures shaped thereon during the grinding operation. Since the secondary area 15 and transition zone 16 project forwardly beyond primary area 14 care must be exercised not to flatten this portion of the lens by overpolishing.

To simultaneously polish all of the areas of the lens blank 10 a polishing wheel or disc 40 is provided. The bottom of disc 40 has a hub 41 fitted within an arbor 42 for driving rotation, and the top surface 43 of the disc is of spherical concave shape corresponding generally to the primary area 14 of the lens blank. Adhered to top surface 43 is a relatively thick layer of resilient deformable material 44, and secured to the top of this layer is a polishing pad such as a felt cloth disc 45.

Lens blank 10 still secured to block 28 is held against polishing pad 45 by a vertical spindle 48 which engages within socket 29. Spindle 48 is in turn mounted on an upper support bar 49 which extends transversely across the top of disc 40. A spring 50 may be mounted on spindle 48 to urge the spindle resiliently downwardly for holding lens blank 10 firmly against pad 45. The presence of resilient layer 44 permits the pad 45 to depress so that it may conform to the exact shape of the front face of lens blank 10, with the entire surface of the blank in firm contact with the surface of the pad.

As disc 40 is rotated, the lens blank 10 in engagement therewith is caused to likewise rotate about its own center as is indicated by the directional arrows in Figure 5. In order to insure equal polishing of all portions of lens blank 10, support bar 49 is mounted for oscillating movement so that it moves back and forth across the surface of pad 45 while remaining offset to one side thereof. For this purpose, one end of bar 49 is connected to a pivot pin 52 by a slot 53, and the other end is eccentrically mounted on a rotatable crank 54 so that as the crank rotates the support bar oscillates back and forth. Polishing compound may be supplied to the surface of pad 45 through a tube 55, and as can be understood the polishing apparatus may be mounted in a suitable enlarged bowl 56 for collecting the polishing compound. Means for rotatably driving both the rotatable disc 40 and the crank 54 are of conventional design and are not shown herein.

It will be noted that since blank 10 is held off center to polishing disc 40 there are no dead areas of non-polishing contact between the face of the disc and the surface of pad 45. The oscillating motion of bar 49 causes the blank to move back and forth across the surface of pad 45 as well as rotatably thereon so that all circular ridges and streaks which might otherwise be formed on the face of the blank are removed by the non-uniform motion. Most important, it can be fully appreciated that the resilient support for pad 45 permits the latter to conform exactly to the shape of the secondary area 15 and transition zone 16 as well as the primary area 14. Thus all of the portions of the lens are simultaneously polished without injury to the composite curvature of the lens.

While we have thus described in some detail the method and apparatus for practicing the invention, modifications in the method and changes in the details of construction of the apparatus can be made without departing from the scope of the invention. Therefore, we do not wish to be restricted to the foregoing except as defined in the appended claims.

We claim:

1. Apparatus for grinding a bifocal lens blank having a primary area and a secondary area of different curvature which includes: a grinding lap having a spherical surface of said primary curvature with an annular zone thereon concentric about an operating axis and providing a surface displaced from said spherical surface and having a cross sectional shape of said different curvature; means for rotating said lap about said operating axis; and means for holding a lens blank against said lap for rotation about the axis of said blank with said axis extending approximately normal to said spherical surface and intersecting the median circle of said annular zone.

2. Apparatus for grinding a bifocal lens blank having a primary area and a secondary area of different curvature which includes: a grinding lap having a spherical surface formed with said primary curvature and an annular zone thereon concentric about an operating axis and having a surface displaced from said spherical surface and shaped in radial cross section to said different curvature and to a transition curvature at the edges thereof for joining with said primary curvature; means for rotating said lap about said operating axis; and means for holding a lens blank against said lap for rotation about the axis of said blank with said axis extending approximately normal to said spherical surface and intersecting the median circle of said annular zone.

3. Apparatus for grinding a bifocal lens blank having a primary area and a secondary area of different curvature which includes: a grinding lap having an internal spherical surface formed with said primary curvature and an annular zone thereon concentric about an operating axis and having a recessed surface of uniform cross section and formed with said different curvature together with a transition curvature at the edges thereof for joining with said primary curvature; means for rotating said lap about said operating axis; and means for holding a lens blank against said lap for free rotation about the axis of said blank with said axis extending approximately normal to said spherical surface and intersecting the median circle of said annular zone.

4. Apparatus for grinding a bifocal lens blank having a primary area and a secondary area of different curvature which includes: a grinding lap having a spherical surface of said primary curvature with an annular zone thereon concentric about an operating axis and providing a surface displaced from said spherical surface and having a cross sectional shape of said different curvature; means for holding a lens blank against said lap for free rotation about the axis of said blank with the axis of said blank extending approximately normal to said spherical surface; and means for moving said blank orbitally about said annular zone of said lap and rotating said blank about its axis.

5. In apparatus for forming a bifocal lens blank having a primary area and a secondary rea of different curvature: means for polishing said lens blank having a polishing layer supported on a resilient backing and adapted for polishing contact with said primary and said secondary areas simultaneously; means for holding said lens blank against said polishing means and moving said blank eccentrically and in a curved path relative to the axis of said polishing means; and means for rotating said polishing means about its own axis.

6. The method of simultaneously grinding a one-piece bifocal lens blank, which includes the steps of: mounting a lens blank for rotation about its own axis; simultaneously placing at least two grinding surfaces, each of dissimilar curvature against said lens blank; and rotating said grinding surfaces orbitally with respect to said lens blank to thereby simultaneously grind said lens blank into zones of different curvature complementary to said grinding surfaces.

7. The method of simultaneously grinding a one-piece bifocal lens blank, which includes the steps of: mounting a lens blank for free rotation about its own axis; simultaneously placing at least two concentric grinding surfaces, each of dissimilar curvature, against said lens blank so that the axis of said lens blank is offset from the axis of said grinding surfaces; and rotating said grinding surfaces orbitally with respect to said lens blank to thereby induce rotation of said lens blank about its own axis to simultaneously grind said lens blank into concentric zones of different curvature complementary to said grinding surfaces.

8. The method of simultaneously grinding a one-piece bifocal lens blank to provide an outer focal area of primary spherical curvature, a concentric inner focal area of secondary spherical curvature, and a zone of transition curvature joining said outer and inner areas, which includes the steps of: mounting a lens blank for free rotation about the axis of said blank; simultaneously placing three concentric grinding surfaces corresponding to the curvatures desired against said lens blank so that the axis of said lens blank is offset from the axis of said grinding surfaces; and rotating said grinding surfaces orbitally with respect to said lens blank to thereby induce rotation of said lens blank about its own axis to simultaneously grind said lens blank into concentric zones of different curvature complemetary to said grinding surfaces.

9. Apparatus for forming a bifocal lens blank having a primary area and a secondary area of different curvature which includes: a grinding lap rotatable about an operating axis; a layer of resiliently deformable material held adjacent said lap; means for polishing said lens blank having an abrasive polishing layer supported on said resilient backing adapted for polishing contact with said primary and said secondary areas of said lens blank simultaneously; means for holding said lens blank offset with respect to the axis of said polishing means and moving said blank eccentrically in a curved path relative to the axis of said polishing means; and means for rotating said polishing means about its own axis.

References Cited in the file of this patent

UNITED STATES PATENTS

| 1,487,715 | Bugbee | Mar. 25, 1924 |
| 1,561,107 | Parsons | Nov. 10, 1925 |
| 1,563,918 | Parsons | Dec. 1, 1925 |
| 1,569,258 | Bugbee | Jan. 12, 1926 |
| 1,738,866 | Bugbee | Dec. 10, 1929 |
| 2,372,535 | Walker | Mar. 27, 1945 |
| 2,715,803 | Bronson | Aug. 23, 1955 |

FOREIGN PATENTS

| 612,828 | Great Britain | Nov. 18, 1948 |